US012726051B2

(12) United States Patent
Kim et al.

(10) Patent No.: US 12,726,051 B2
(45) Date of Patent: Sep. 1, 2026

(54) WIRELESS CHARGING DEVICE WITH IMPROVED CHARGING EFFICIENCY AND HEAT GENERATION REDUCTION EFFECT

(71) Applicants: Hyundai Motor Company, Seoul (KR); Kia Corporation, Seoul (KR); Industry Foundation of Chonnam National University, Buk-gu (KR)

(72) Inventors: Young Min Kim, Siheung-si (KR); Dong Hee Kim, Seo-gu (KR); Chang Su Shin, Nam-gu (KR); Seung Jin Jo, Buk-gu (KR)

(73) Assignees: Hyundai Motor Company, Seoul (KR); Kia Corporation, Seoul (KR); Industry Foundation of Chonnam National University, Gwangju (KR)

( * ) Notice: Subject to any disclaimer, the term of this patent is extended or adjusted under 35 U.S.C. 154(b) by 721 days.

(21) Appl. No.: 18/085,938

(22) Filed: Dec. 21, 2022

(65) Prior Publication Data

US 2023/0378821 A1 Nov. 23, 2023

(30) Foreign Application Priority Data

May 20, 2022 (KR) ........................ 10-2022-0062181

(51) Int. Cl.

*H02J 50/70* (2016.01)
*H01F 27/36* (2006.01)
*H02J 50/00* (2016.01)
*H02J 50/10* (2016.01)

(52) U.S. Cl.

CPC ............ *H02J 50/70* (2016.02); *H01F 27/361* (2020.08); *H02J 50/005* (2020.01); *H02J 50/10* (2016.02)

(58) Field of Classification Search

CPC .......... H02J 50/70; H02J 50/005; H02J 50/10; H01F 27/361; H01F 27/366; H01F 1/032; H01F 1/14708; H01F 1/14766; H01F 7/02; B60L 53/12; B60L 53/122

See application file for complete search history.

(56) References Cited

U.S. PATENT DOCUMENTS 8,472,201 B2 6/2013 Takahashi
9,126,491 B2 * 9/2015 Ichikawa ................ H01F 38/14
10,398,067 B2 * 8/2019 Lee ...................... H05K 9/0088
10,819,156 B2 10/2020 Zaheer et al.
11,152,151 B2 * 10/2021 Singh ...................... H02J 50/70
11,171,514 B2 * 11/2021 Sueyoshi ................ H02J 50/12
11,303,153 B2 * 4/2022 Baek ....................... H02J 50/12
11,742,138 B2 * 8/2023 You ....................... B60L 3/0007 336/84 M (Continued)

FOREIGN PATENT DOCUMENTS

KR 1006774 B 1/2011
KR 10-1477408 B1 12/2014

(Continued)

*Primary Examiner* — Jared Fureman

(74) *Attorney, Agent, or Firm* — Fish & Richardson P.C.

(57) ABSTRACT

A wireless charging device is proposed. The wireless charging device may maximize charging efficiency improvement and heat generation reduction effect by appropriately arranging a second magnetic body on a first magnetic body, resulting in an offset of a magnetic flux linkage occurring inside an aluminum shield due to a magnetic field having passed through the first magnetic body.

20 Claims, 5 Drawing Sheets

(56) References Cited

U.S. PATENT DOCUMENTS

| | | | | |
|---|---|---|---|---|
| 11,962,161 | B2 * | 4/2024 | Kim | H02J 50/005 |
| 11,994,915 | B1 * | 5/2024 | Parsian | G06F 1/1656 |
| 12,391,134 | B2 * | 8/2025 | Kim | H02J 50/12 |
| 2016/0355094 | A1 * | 12/2016 | Yamakawa | H02J 7/0042 |
| 2019/0044391 | A1 * | 2/2019 | Jang | H01F 38/14 |
| 2023/0344274 | A1 * | 10/2023 | Kim | B60L 3/00 |
| 2024/0283293 | A1 * | 8/2024 | Seong | B60L 53/122 |

FOREIGN PATENT DOCUMENTS

| | | | | | |
|---|---|---|---|---|---|
| KR | 1732944 | B | | 5/2017 | |
| KR | 20180087569 | A | | 8/2018 | |
| KR | 10-2020-0012916 | A | | 2/2020 | |
| KR | 20200067294 | A | | 6/2020 | |
| KR | 20210051335 | A | * | 5/2021 | H01F 27/2823 |
| KR | 20210061720 | A | * | 5/2021 | H02J 50/10 |
| KR | 2347719 | B | | 1/2022 | |
| KR | 2359780 | B | | 2/2022 | |
| KR | 10-2022-0041483 | A | | 4/2022 | |
| WO | WO-2021086066 | A1 | * | 5/2021 | H02J 50/70 |

* cited by examiner

WIRELESS CHARGING DEVICE WITH IMPROVED CHARGING EFFICIENCY AND HEAT GENERATION REDUCTION EFFECT

CROSS REFERENCE TO RELATED APPLICATION

The present application claims priority to Korean Patent Application No. 10-2022-0062181, filed May 20, 2022, the entire contents of which is incorporated herein for all purposes by this reference.

TECHNICAL FIELD

The present disclosure relates to a wireless charging device with improved charging efficiency and heat generation reduction effect.

BACKGROUND

A wireless charging device for an electric vehicle battery is a device in which a receiving unit thereof converts a strong magnetic field generated in a transmitting unit into electricity in accordance with the change in the magnetic field. Each of the transmitting unit and the receiving unit is composed of a coil part and a magnetic body. The coil part serves to convert electrical energy into magnetic energy (magnetic field), and the magnetic body serves to strengthen and to shield the generated magnetic field such that the generated magnetic field has directionality.

Currently, a Mn—Zn ferrite sintered magnetic material having a high magnetic permeability of about 4,000 u is used for the transmitting unit and the receiving unit of the wireless battery charging device. Since the Mn—Zn ferrite sintered material is brittle, there is a high risk of being easily damaged in the event of an impact during a module assembling process or vehicle driving.

Compared to the existing Mn—Zn ferrite, a composite material that is easy to manufacture in a large size and can ensure durability is considered, but the material has the disadvantages of a high internal AC resistance (Rate) and low magnetic permeability that affects charging efficiency and heat generation reduction due to limitation in filling magnetic powder.

When the magnetic permeability of the magnetic body used in the transmitting unit and the receiving unit is low, the strong magnetic field generated from the coil part passes through the magnetic body and affects a control circuit of a wireless charging system, or a magnetic flux linkage occurs in the shield, resulting in deterioration in charging efficiency and an increase in heat generation in the peripheral area.

SUMMARY

Accordingly, the present disclosure has been made in an effort to solve the problems described above. An objective of the present disclosure is to provide a wireless charging device with improved charging efficiency and heat generation reduction effect by appropriately arranging a second magnetic body on a first magnetic body part to offset magnetic flux linkage occurring inside a shield part that is made of the aluminum material due to a magnetic field having passed through the first magnetic body.

The objective of the present disclosure is not limited to those described above. The objective of the present disclosure will become clearer from the following description and will be realized by means described in the claims and combinations thereof.

According to the present disclosure, a wireless charging device may include a first magnetic body part having a plane shape, a second magnetic body part having a plane shape and disposed on the first magnetic body part, a coil part disposed under the first magnetic body part, and a shield part disposed on the second magnetic body part and made of an aluminum material.

The first magnetic body part may include a central part ranging from a center point of the first magnetic body part to a predetermined distance outward from the center point and an edge part that is a remaining region other than the central part, in which an area of the central part may be about 20% to 80% of a total area of the first magnetic body part.

The first magnetic body part may be made of a soft magnetic material including at least one selected from the group consisting of Fe, Fe—Si, Fe—Si—Al, Fe—Al, Fe—Co, Fe—Si—Cr, Stainless steel, Ni—Fe, Ni—Fe—Mo, Mn—Zn Ferrite, Ni—Zn Ferrite, Fe—Si—B-based amorphous, Fe—Si—B—Cu—Nb-based nanocrystal grains, and combinations thereof.

The second magnetic body part may be disposed on central part of the first magnetic body part and an area of the second magnetic body part may be about 1% to 100% of an area of the coil part.

The second magnetic body part may be made of a hard magnetic material including a permanent magnet.

The permanent magnet may include at least one selected from the group consisting of an alnico magnet, a ferrite magnet, a rare earth magnet, a rubber magnet, a plastic magnet, a neodymium (NdFeB) magnet, a FeCrCo magnet, and combinations thereof.

The second magnetic body part may have a frame shape formed along a boundary of the central part or the edge part of the first magnetic body.

The second magnetic body part may be formed by extending along the periphery of the edge part of the first magnetic body.

The second magnetic body part may be formed by radially extending from the center point of the central part of the first magnetic body.

The second magnetic body part may have a residual induction (Br) of about 2300 G to 2500 G.

The second magnetic body part may have a coercive force (bHc) of about 2100 Oe to 2300 Oe.

The second magnetic body part may have an intrinsic coercive force (iHc) of about 3000 Oe to 3200 Oe.

The second magnetic body part may have maximum energy product ((BH)max) of about 1.35 MG·Oe to 1.55 MG·Oe The second magnetic body part may have a density of about 3.5 $g/cm^3$ to 3.7 $g/cm^3$.

The coil part may be structure such that a plurality of wires is wound in parallel A wireless charging device for an electric vehicle battery may include the wireless charging device of the present disclosure The wireless charging device according to the present disclosure has the effect of improving charging efficiency and reducing heat generation.

The effects of the present disclosure are not limited to the above-mentioned effects. It should be understood that the effects of the present disclosure include all effects that can be inferred from the following description.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

The above and other objectives, features, and other advantages of the present disclosure will be easily understood with reference to the following implementations in conjunction with the accompanying drawings. However, the present disclosure is not limited to the implementations described herein and may be embodied in other forms. Rather, the implementations introduced herein are provided so that the disclosed content may be thorough and complete, and the idea of the present disclosure may be sufficiently conveyed to those skilled in the art.

Wireless Charging Device

Figure 1:
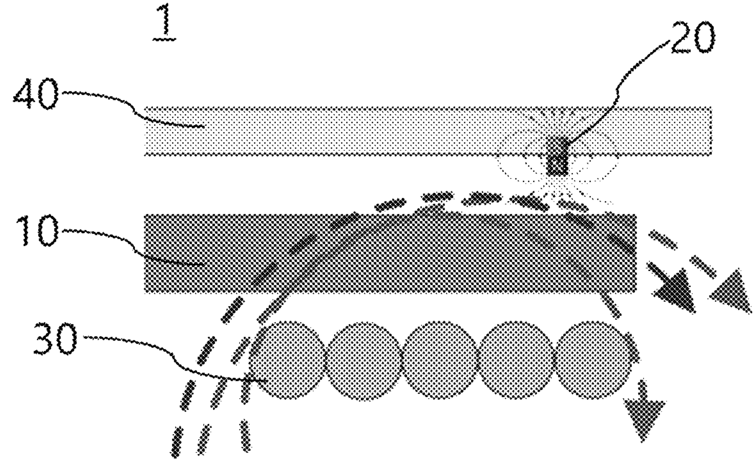
FIG. 1 is a view schematically illustrating a wireless charging device according to the present disclosure.

FIG. 1 is a view schematically illustrating a wireless charging device according to the present disclosure. A wireless charging device 1 according to the present disclosure may include a planar first magnetic body part 10, a planar second magnetic body part 20, a coil part 30, and a shield part 40.

The first magnetic body part 10 according to the present disclosure serves to strengthen and shield a generated magnetic field from the coil part 30 such that the generated magnetic field has directionality.

Figure 2:
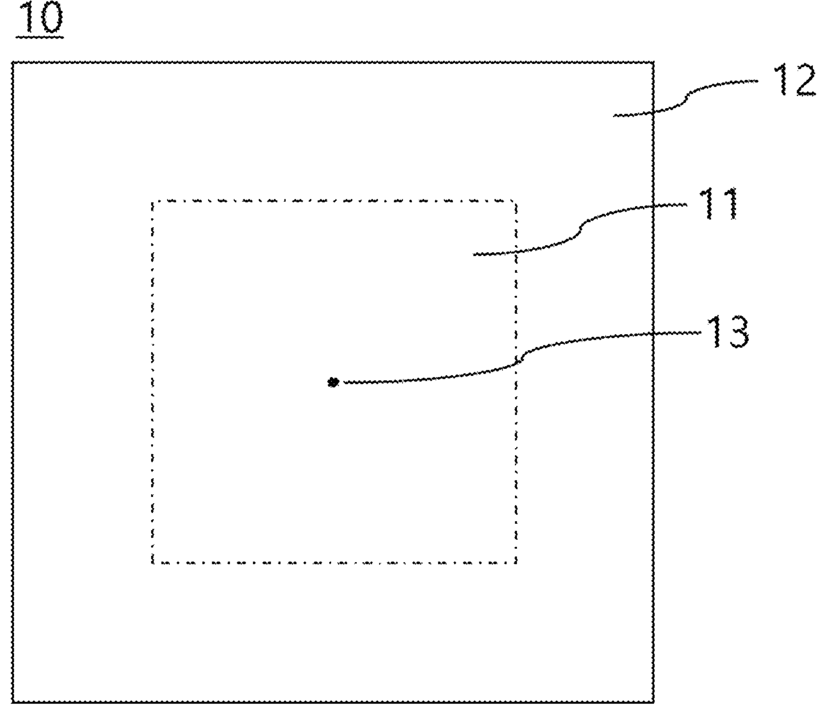
FIG. 2 is a view illustrating a first magnetic body part according to the present disclosure.

FIG. 2 is a view illustrating the first magnetic body part according to the present disclosure. Referring to FIG. 2, the first magnetic body part 10 according to the present disclosure may be formed in a plane shape and may include a central part 11 that is a predetermined area at the central part and an edge part 12 that is a remaining area other than the central part 11. As an example, although shown in a square, the first magnetic body part may have various shapes. For example, the shape of the first magnetic body part may be similar to the shape of the coil part 30 and may have a shape capable of covering all the part of the coil part 30.

The central part 11 range from a center point 13 of the first magnetic body part 10 to a predetermined distance outward from the center point 13, and an area of the central part 11 may be 20% to 80% of a total area of the first magnetic body part 10.

The first magnetic body part 10 is not particularly limited, but as an implementation, it may be made of a soft magnetic material including at least one selected from the group consisting of Fe, Fe—Si, Fe—Si—Al, Fe—Al, Fe—Co, Fe—Si—Cr, Stainless steel, Ni—Fe, Ni—Fe—Mo, Mn—Zn Ferrite, Ni—Zn Ferrite, Fe—Si—B-based amorphous, Fe—Si—B—Cu—Nb-based nanocrystal grains, and combinations thereof.

The second magnetic body part 20 according to the present disclosure may be disposed on the first magnetic body part 10 and may be formed in a plane shape.

The second magnetic body part 20 may be made of a hard magnetic material including a permanent magnet. The permanent magnet may include at least one selected from the group consisting of an alnico magnet, a ferrite magnet, a rare earth magnet, a rubber magnet, a plastic magnet, a neodymium (NdFeB) magnet, a FeCrCo magnet, and combinations thereof. For example, the second magnetic body part 20 may be a rubber magnet. The rubber magnet generally belongs to a magnet with low performance and has an advantage of being inexpensive.

Figure 3:
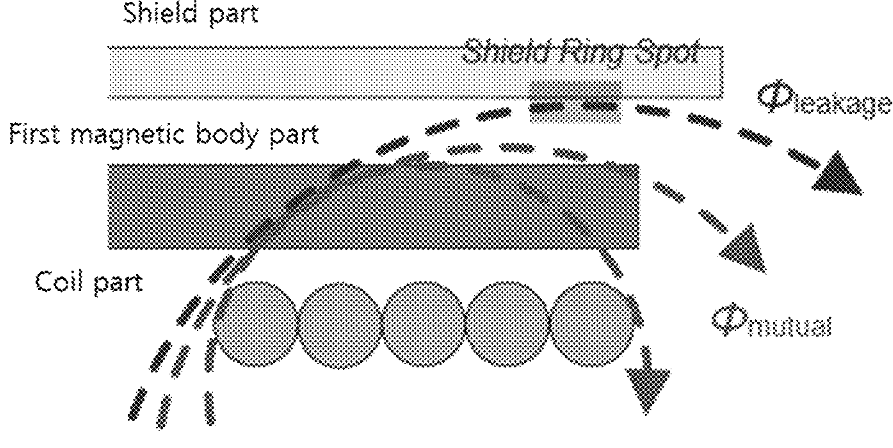
FIG. 3 is a view schematically illustrating a conventional wireless charging device without a second magnetic body.

FIG. 3 a view schematically illustrating a conventional wireless charging device equipped with no second magnetic body. Referring to FIG. 3, when the magnetic permeability of the magnetic body in the transmitting unit or the receiving unit is low, the strong magnetic field generated from the coil part passes through the magnetic body part generates a magnetic flux linkage in the shield part, resulting in deterioration in charging efficiency and increase in heat generation in the peripheral area. A leaked magnetic flux increases in proportion to the magnitude of the current.

On the other hand, referring to FIG. 1, in the present disclosure, the second magnetic body part 20 is appropriately disposed on the first magnetic body part 10 having a low magnetic permeability. Therefore, the magnetic flux linkage occurring inside the aluminum shield part 40 due to a magnetic field having passed through the first magnetic body part 10 can be offset, resulting in improvement in charging efficiency and reduction in heat generation.

Figure 4:
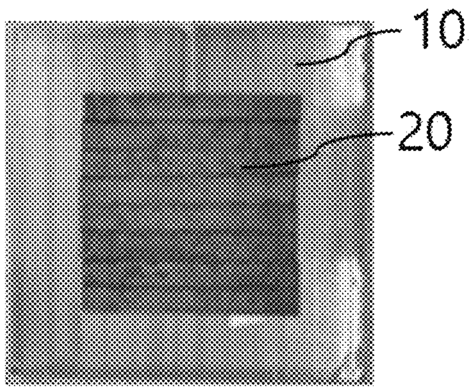
FIGS. 4 to 7 are views illustrating arrangements of the second magnetic body part according to implementations of the present disclosure.

FIGS. 4 to 7 are views illustrating arrangements of the second magnetic body part according to implementations of the present disclosure. Referring to FIG. 4, the second magnetic body part 20 is disposed on the central part of the first magnetic body part 10, and an area of the second magnetic body part 20 may be 1% to 200% of an area of the central part, and preferably 30% to 70%. In addition, the area of the second magnetic body part 20 may be 1% to 200% of an area of the coil part, and preferably 1% to 100%.

Figure 5:
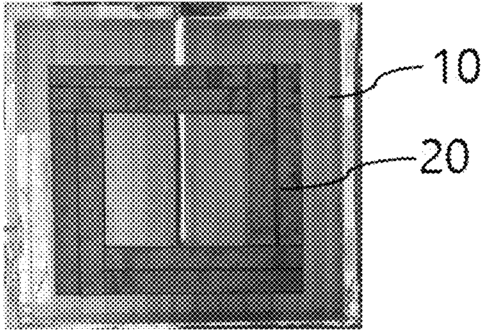

Referring to FIG. 5, the second magnetic body part 20 may have a frame shape formed along the boundary of the central part or the edge part of the first magnetic body part 10.

Figure 6:
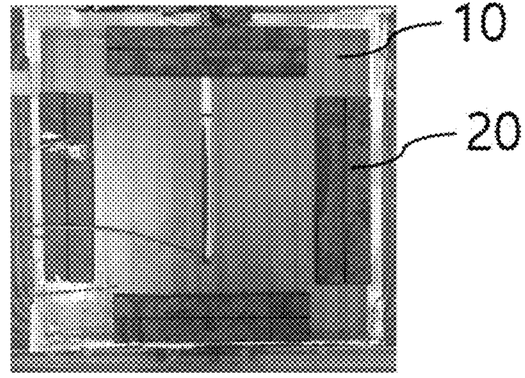

Referring to FIG. 6, the second magnetic body part 20 may be formed by extending along the periphery of the edge part of the first magnetic body part 10.

Figure 7:
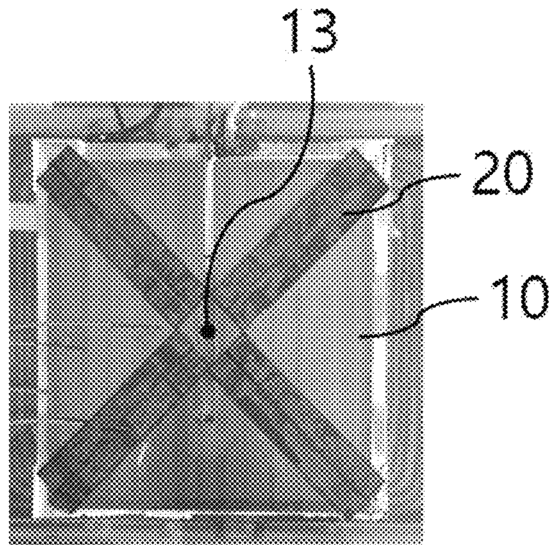

Referring to FIG. 7, the second magnetic body part 20 may be formed by radially extending from the center point 13 of the central part of the first magnetic body. For example, the angle between the major axes of the second magnetic body part may be 90°.

The second magnetic body part may have a residual induction (Br) of 2300 G to 2500 G. However, when the residual induction is less than 2300 G, the effect of offsetting the leakage flux may decrease. In addition, when the residual induction exceeds 2500 G, a thickness or the area of the second magnetic body part increases, and thus the price may increase.

The second magnetic body part may have a coercive force (bHc) of 2100 Oe to 2300 Oe. However, when the coercive force is less than 2100 Oe, the performance of offsetting the leakage flux may decrease. In addition, when the coercive force exceeds 2300 Oe, the price may increase.

The second magnetic body part may have an intrinsic coercive force (iHc) of 3000 Oe to 3200 Oe. However, when the intrinsic coercive force is less than 3000 Oe, the performance of offsetting the leakage flux may decrease. In addition, when the intrinsic coercive force exceeds 3200 Oe, the thickness or the area of the second magnetic body part increases, and thus the price may increase.

The second magnetic body part may have maximum energy product ((BH)max) of 1.35 MG·Oe to 1.55 MG·Oe. However, when the maximum energy product is less than 1.35 MG·Oe, the performance of offsetting the leakage flux may decrease. In addition, when the maximum energy product exceeds 1.55 MG·Oe, the thickness or the area of the second magnetic body part increases, and thus the price may increase.

The second magnetic body part may have a density of 3.5 $g/cm^3$ to 3.7 $g/cm^3$. However, when the density is less than 3.5 $g/cm^3$, the performance of offsetting the leakage flux may decrease. In addition, when the density exceeds 3.7 $g/cm^3$, the thickness or the area of the second magnetic body part increases, and thus the price may increase.

The coil part 30 according to the present disclosure, serves to convert electrical energy into magnetic energy (magnetic field).

The coil part 30 may be disposed under the central part of the first magnetic body part 10.

Figure 8:
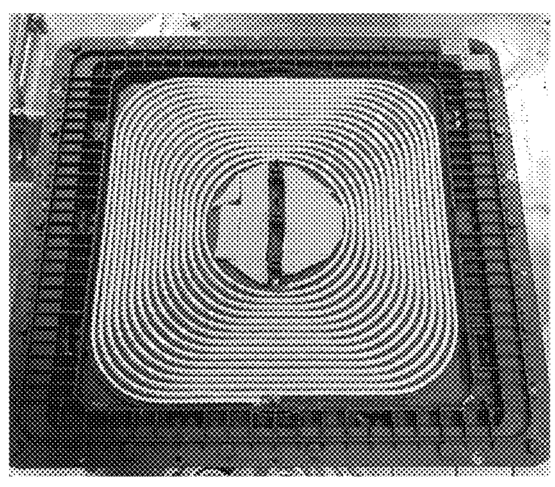
FIG. 8 is a view illustrating a coil according to an implementation of the present disclosure.

FIG. 8 is a view illustrating a coil according to an implementation of the present disclosure. Referring to FIG. 8, the coil part 30 may be structured such that a plurality of wires is wound in parallel to form a spiral pattern. The wire may include copper (Cu).

The area of the coil part may be 1% to 200% of the area of the central part, preferably 50% to 120%.

According to the present disclosure, a wireless charging device for an electric vehicle battery may include the wireless charging device of the present disclosure.

Hereinafter, the present disclosure will be described in detail with reference to the following implementations and comparative implementations. However, the technical idea of the present disclosure is not limited thereto.

Implementations and Comparative Implementations

The wireless charging devices of Implementations 1 to 4 and Comparative Implementations 1 to 2 were manufactured as described below.

Implementation 1

A wireless charging device was manufactured by applying the arrangement of the second magnetic body part of FIG. 4

Implementation 2

A wireless charging device was manufactured in the same manner as in Implementation 1, except that the arrangement of the second magnetic body part of FIG. 5 was applied.

Implementation 3

A wireless charging device was manufactured in the same manner as in Implementation 1, except that the arrangement of the second magnetic body part of FIG. 6 was applied.

Implementation 4

A wireless charging device was manufactured in the same manner as in Implementation 1, except that the arrangement of the second magnetic body part of FIG. 7 was applied.

Comparative Implementation 1

A wireless charging device was manufactured in the same manner as in Implementation 1, except that there was no second magnetic body.

Comparative Implementation 2

A wireless charging device was manufactured in the same manner as in Implementation 1, except that the second magnetic body part was disposed under the shield part, rather than the first magnetic body.

Experimental Example 1: Comparison of the Effect of the Presence and Placement of the Second Magnetic Body An experiment was conducted to compare charging efficiency and heat generation of the wireless charging devices manufactured in Implementations 1 to 4 and Comparative Implementations 1 to 2. The results are shown in Table 1.

TABLE 1

| | | No SMB | Difference in arrangement of the SMB | | | | |
|---|---|---|---|---|---|---|---|
| | | CEm 1 | Em 1 | Em 2 | Em 3 | Em 4 | CEm 2 |
| CE (%) | 3.3 kW | 90.65 | 91.14 | 90.74 | 90.76 | 90.64 | 90.93 |
| | 6.6 kW | 91.13 | 91.59 | 91.73 | 91.49 | 91.39 | 91.54 |
| HG | Temp (° C.) | 70.4 | 47.2 | 56.5 | 71.2 | 68.4 | 65.5 |
| (6.6 kW) | OT (min) | 20 | | | 30 | | |

CE: Charging efficiency
HG: Heat generation
Temp: Temperature
OT: Operation time
SMB: Second Magnetic Body
Em: Implementation
CEm: Comparative Implementation According to the present disclosure, the wireless charging device 1, may include the shield part 40 made of aluminum material, disposed on the second magnetic body part 20.

The second magnetic body part 20 may be positioned between the first magnetic body part 10 and the shield part 40.

The second magnetic body part 20 and the shield part 40 may not be in contact with each other.

Figure 9:
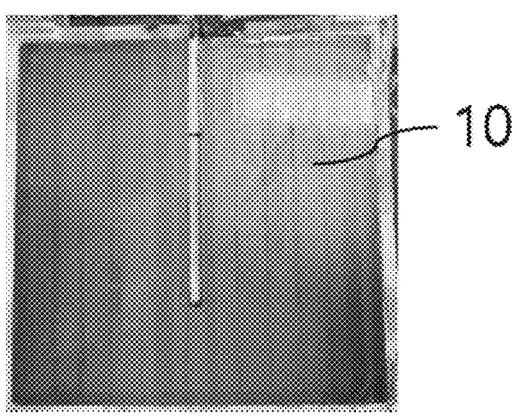
FIG. 9 is a view illustrating an arrangement of the second magnetic body part of Comparative Implementation 1 of the present disclosure.
Figure 10:
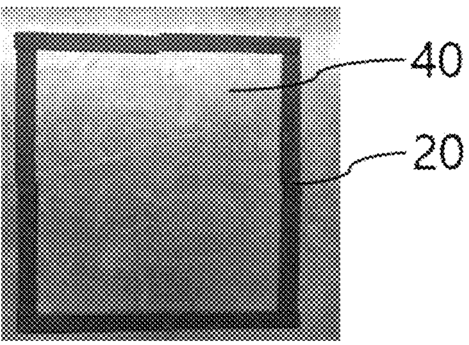
FIG. 10 is a view illustrating an arrangement of the second magnetic body part of Comparative Implementation 2 of the present disclosure.
Figure 11:
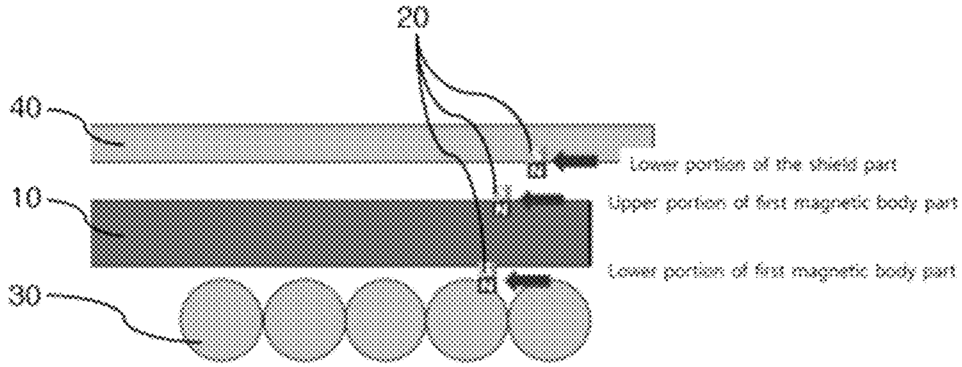
FIG. 11 is a reference view illustrating arrangement positions of the second magnetic bodies according to implementations and comparative implementations of the present disclosure.

FIG. 9 shows the arrangement of the second magnetic body part of Comparative Implementation 1 of the present disclosure. FIG. 10 shows the arrangement of the second magnetic body part of Comparative Implementation 2 of the present disclosure. FIG. 11 is a reference diagram showing arranged positions of the second magnetic bodies according to implementations and comparative implementations according to the present disclosure. Referring to Table 1 and FIGS. 4 to 11, it may be seen that Comparative Implementation 1, without second magnetic body, have lower charging efficiency and higher heat generation at the temperature than Implementations 1 to 4 and Comparative Implementation 2 which includes the second magnetic body. This is because when the strong magnetic field generated at the coil part passes through the first magnetic body, the passed magnetic field affects a control circuit of the wireless charging device, or the magnetic flux linkage generated in the shield part degrades charging efficiency and increases heat generation in the peripheral area.

In addition, it can be found that Comparative Implementation 2, in which the second magnetic body part is disposed under the shield part, rather than the first magnetic body, also has less effect in charging efficiency and heat generation reduction than those of Implementations 1 and 2.

The reason why the charging efficiency improvement and the heat generation reduction effect of Implementations 1 and 2 can be more effective as described above is that the second magnetic body part is disposed in a position and shape that is similar to the coil part disposed at the center of the first magnetic body.

Therefore, the wireless charging device according to the present disclosure may maximize charging efficiency improvement and heat generation reduction effect by appropriately arranging a second magnetic body part on the first magnetic body, resulting in an offset of the magnetic flux linkage occurring inside the aluminum shield part due to a magnetic field having passed through the first magnetic body.

As described above, it will be understood by those skilled in the art that is related to the present disclosure that the present disclosure may be implemented in other specific forms without changing the technical idea or essential features thereof. Therefore, it should be understood that the implementations described above are exemplary and not limited in all respects.

What is claimed is:

1. A wireless charging device comprising:
- a first magnetic body having a plane shape;
- a second magnetic body having a plane shape and disposed on the first magnetic body;
- a coil disposed under the first magnetic body; and
- a shield disposed on the second magnetic body,
- wherein the shield comprises an aluminum material,
- wherein the first magnetic body comprises a soft magnetic material, and
- wherein the second magnetic body comprises a hard magnetic material.

2. The wireless charging device of claim 1, wherein the first magnetic body comprises:
- a central part that extends from a center of the first magnetic body to a predetermined distance outward from the center; and
- an edge part that is a remaining region other than the central part of the first magnetic body,
- wherein an area of the central part is 20% to 80% of a total area of the first magnetic body.

3. The wireless charging device of claim 2, wherein the second magnetic body is disposed on the central part of the first magnetic body and an area of the second magnetic body is 1% to 100% of an area of the coil.

4. The wireless charging device of claim 2, wherein the second magnetic body has a frame shape disposed along a boundary of the central part or the edge part of the first magnetic body.

5. The wireless charging device of claim 2, wherein the second magnetic body extends along an outer periphery of the edge part of the first magnetic body.

6. The wireless charging device of claim 2, wherein the second magnetic body is radially disposed with respect to the center of the first magnetic body.

7. The wireless charging device of claim 1,
- wherein the soft magnetic material comprises at least one of Fe, Fe—Si, Fe—Si—Al, Fe—Al, Fe—Co, Fe—Si—Cr, Stainless steel, Ni—Fe, Ni—Fe—Mo, Mn—Zn Ferrite, Ni—Zn Ferrite, Fe—Si—B-based amorphous, Fe—Si—B—Cu—Nb-based nanocrystal grains, or any combination thereof.

8. The wireless charging device of claim 1,
- wherein the hard magnetic material comprises a permanent magnet.

9. The wireless charging device of claim 8, wherein the permanent magnet comprises at least one of an alnico magnet, a ferrite magnet, a rare earth magnet, a rubber magnet, a plastic magnet, a neodymium (NdFeB) magnet, a FeCrCo magnet, or any combination thereof.

10. The wireless charging device of claim 1, wherein the second magnetic body has a residual induction (Br) of 2300 G to 2500 G.

11. The wireless charging device of claim 1, wherein the second magnetic body has a coercive force (bHc) of 2100 Oe to 2300 Oe.

12. The wireless charging device of claim 1, wherein the second magnetic body has an intrinsic coercive force (iHc) of 3000 Oe to 3200 Oe.

13. The wireless charging device of claim 1, wherein the second magnetic body has a maximum energy product ((BH)max) of 1.35 MG·Oe to 1.55 MG·Oe.

14. The wireless charging device of claim 1, wherein the second magnetic body has a density of 3.5 $g/cm^3$ to 3.7 $g/cm^3$.

15. The wireless charging device of claim 1, wherein the coil comprises a plurality of wires being wound in parallel, and
- wherein the plurality of wires constitutes a spiral pattern.

16. A vehicle comprising:
- a wireless charging device comprising:
  - a first magnetic body having a plane shape,
  - a second magnetic body having a plane shape and disposed on the first magnetic body,
  - a coil disposed under the first magnetic body, and
  - a shield disposed on the second magnetic body,
- wherein the shield comprises an aluminum material,
- wherein the first magnetic body comprises a soft magnetic material, and
- wherein the second magnetic body comprises a hard magnetic material.

17. The vehicle of claim 16, wherein the first magnetic body comprises:
- a central part that extends from a center of the first magnetic body to a predetermined distance outward from the center; and
- an edge part that is a remaining region other than the central part of the first magnetic body,
- wherein an area of the central part is 20% to 80% of a total area of the first magnetic body.

18. The vehicle of claim 17, wherein the second magnetic body is disposed on the central part of the first magnetic body and an area of the second magnetic body is 1% to 100% of an area of the coil.

19. The vehicle of claim 16, wherein the soft magnetic material comprises at least one of Fe, Fe—Si, Fe—Si—Al, Fe—Al, Fe—Co, Fe—Si—Cr, Stainless steel, Ni—Fe, Ni—Fe—Mo, Mn—Zn Ferrite, Ni—Zn Ferrite, Fe—Si—B-based amorphous, Fe—Si—B—Cu—Nb-based nanocrystal grains, or any combination thereof.

20. The vehicle of claim 16, wherein the hard magnetic material comprises a permanent magnet.

* * * * *